US012476253B2

(12) United States Patent
Sato et al.

(10) Patent No.: US 12,476,253 B2
(45) Date of Patent: Nov. 18, 2025

(54) POSITIVE ELECTRODE FOR LITHIUM ION SECONDARY BATTERY, POSITIVE ELECTRODE SHEET FOR LITHIUM ION SECONDARY BATTERY, AND METHOD FOR MANUFACTURING THE SAME

(71) Applicant: AESC JAPAN Ltd., Zama (JP)

(72) Inventors: Moeko Sato, Zama (JP); Takeshi Saito, Zama (JP); Shoichiro Shiraishi, Zama (JP)

(73) Assignee: AESC JAPAN LTD., Zama (JP)

( * ) Notice: Subject to any disclaimer, the term of this patent is extended or adjusted under 35 U.S.C. 154(b) by 694 days.

(21) Appl. No.: 17/599,307

(22) PCT Filed: Mar. 2, 2020

(86) PCT No.: PCT/JP2020/008660
§ 371 (c)(1),
(2) Date: Sep. 28, 2021

(87) PCT Pub. No.: WO2020/202973
PCT Pub. Date: Oct. 8, 2020

(65) Prior Publication Data
US 2022/0173388 A1   Jun. 2, 2022

(30) Foreign Application Priority Data
Mar. 29, 2019 (JP) ................. 2019-067769

(51) Int. Cl.
*H01M 4/62* (2006.01)
*H01M 4/64* (2006.01)
(Continued)

(52) U.S. Cl.
CPC ............. *H01M 4/62* (2013.01); *H01M 4/621* (2013.01); *H01M 4/622* (2013.01); *H01M 4/623* (2013.01);
(Continued)

(58) Field of Classification Search
CPC ............. H01M 4/62; H01M 2004/028; H01M 4/621; H01M 4/622; H01M 4/623; H01M 4/625; H01M 4/64; H01M 2004/021
See application file for complete search history.

(56) References Cited

U.S. PATENT DOCUMENTS 9,099,757 B2   8/2015   Tanaka et al.
9,865,881 B2   1/2018   Araki et al.
(Continued)

FOREIGN PATENT DOCUMENTS

CN   102468475 A   5/2012
CN   109244362 A   1/2019
(Continued)

OTHER PUBLICATIONS

Extended European Search Report dated Apr. 13, 2022 in European Application No. 20783486.2.
(Continued)

*Primary Examiner* — Laura Weiner
(74) *Attorney, Agent, or Firm* — Sughrue Mion, PLLC

(57) ABSTRACT

Provided is a positive electrode for a lithium ion secondary battery including a metal foil (9) (current collector), a first mixture layer (11) which is provided on one surface of the metal foil (9) and contains a positive electrode active material, and a second mixture layer (12) which is partially covered by the first mixture layer (11) and includes, as a main component, particles different from the active material, in which the second mixture layer (12) is provided on one end (11a) side of the first mixture layer (11) in a boundary portion between a formed area of the first mixture layer (11) and a non-formed area of the first mixture layer (11), one end (12a) of the second mixture layer (12) is positioned between the one surface of the metal foil (9) and a lower surface of the first mixture layer (11) in the formed area of the first mixture layer (11), and the other end (12b) is positioned in
(Continued)

the non-formed area, and the first mixture layer (11) and the second mixture layer (12) contain a dispersed conductive substance.

12 Claims, 10 Drawing Sheets

(51) Int. Cl.
*H01M 4/02* (2006.01)
*H01M 4/131* (2010.01)
*H01M 10/0525* (2010.01)

(52) U.S. Cl.
CPC ............ *H01M 4/625* (2013.01); *H01M 4/64* (2013.01); *H01M 2004/021* (2013.01); *H01M 2004/028* (2013.01); *H01M 4/131* (2013.01); *H01M 10/0525* (2013.01)

(56) References Cited

U.S. PATENT DOCUMENTS

| | | |
|---|---|---|
| 2002/0197535 A1 | 12/2002 | Dudley et al. |
| 2004/0202928 A1 | 10/2004 | Miyamoto et al. |
| 2007/0048613 A1 | 3/2007 | Yanagida et al. |
| 2008/0311479 A1 | 12/2008 | Lee et al. |
| 2009/0246612 A1 | 10/2009 | Naoi et al. |
| 2012/0058375 A1 | 3/2012 | Tanaka et al. |
| 2012/0115030 A1 | 5/2012 | Tanaka et al. |
| 2012/0196172 A1 | 8/2012 | Maeda et al. |
| 2014/0011064 A1 | 1/2014 | Matsuda et al. |
| 2014/0072877 A1 | 3/2014 | Araki et al. |
| 2019/0088951 A1 | 3/2019 | Hanazaki et al. |

FOREIGN PATENT DOCUMENTS

| | | |
|---|---|---|
| JP | 10-74535 A | 3/1998 |
| JP | 2003-151535 A | 5/2003 |
| JP | 2004-259625 A | 9/2004 |
| JP | 2005-509247 A | 4/2005 |
| JP | 2006-147392 A | 6/2006 |
| JP | 2007-095656 A | 4/2007 |
| JP | 2009-518808 A | 5/2009 |
| JP | 2009-238487 A | 10/2009 |
| JP | 2011-081920 A | 4/2011 |
| JP | 2012-074359 A | 4/2012 |
| JP | 2012-114079 A | 6/2012 |
| JP | 2012-178326 A | 9/2012 |
| JP | 2012-204334 A | 10/2012 |
| JP | 2016-186945 A | 10/2016 |
| JP | 2017-157471 A | 9/2017 |
| WO | 2012/128160 A1 | 9/2012 |
| WO | 2018168271 A1 | 9/2018 |
| WO | 2018168272 A1 | 9/2018 |

OTHER PUBLICATIONS

International Search Report for PCT/JP2020/008660 dated Apr. 14, 2020 [PCT/ISA/210].

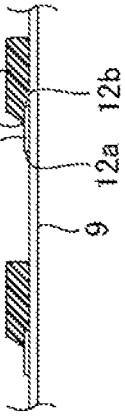
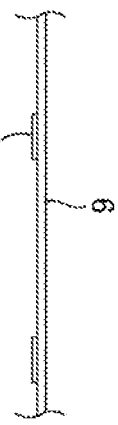
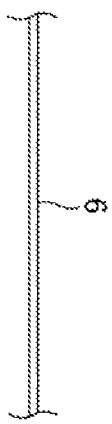
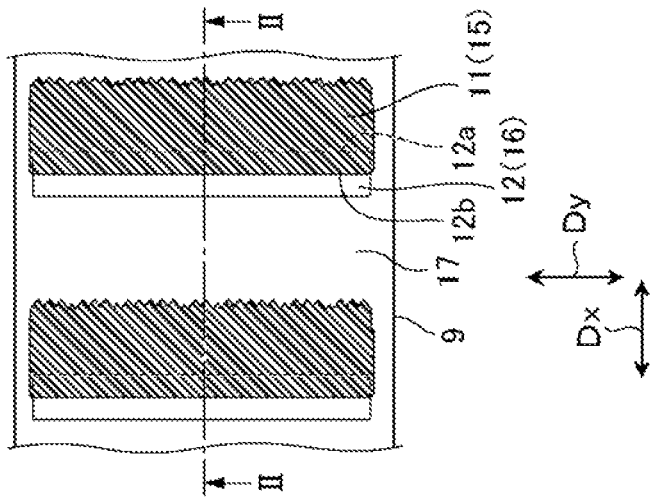
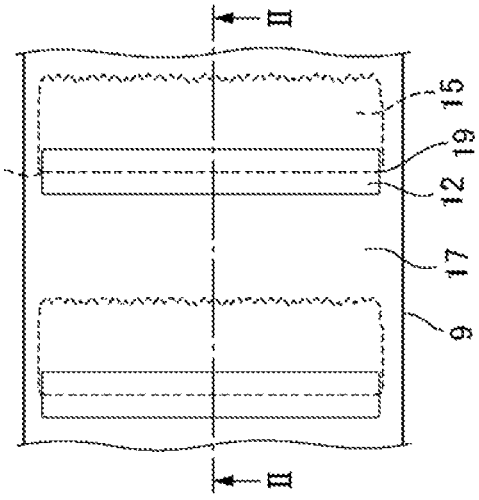
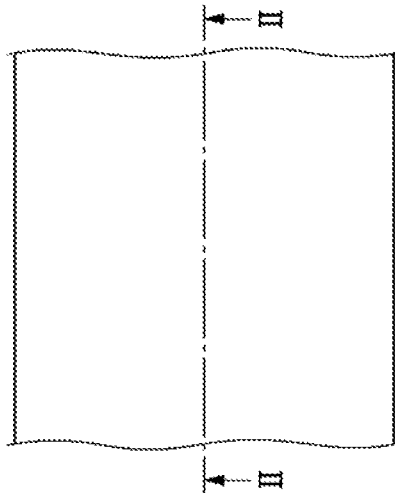

FIG. 9A1  FIG. 9A2  FIG. 9A3
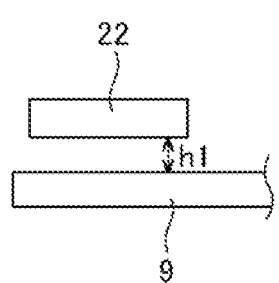 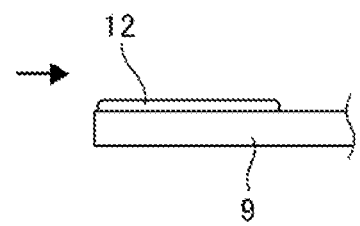 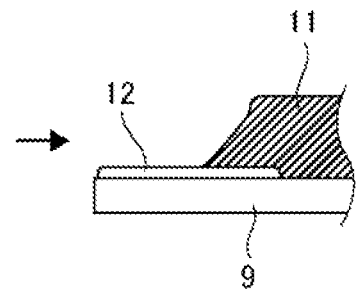
FIG. 9B1  FIG. 9B2  FIG. 9B3
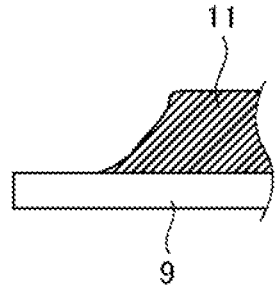 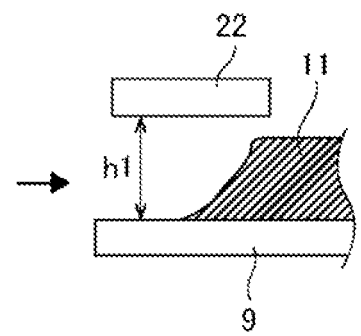 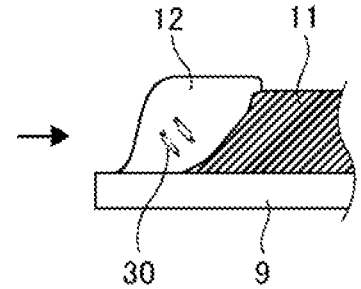

POSITIVE ELECTRODE FOR LITHIUM ION SECONDARY BATTERY, POSITIVE ELECTRODE SHEET FOR LITHIUM ION SECONDARY BATTERY, AND METHOD FOR MANUFACTURING THE SAME

CROSS REFERENCE TO RELATED APPLICATIONS

This application is a National Stage of International Application No. PCT/JP2020/008660 filed Mar. 2, 2020, claiming priority based on Japanese Patent Application No. 2019-067769 filed Mar. 29, 2019, the disclosures of which are incorporated by reference herein in their entirety.

TECHNICAL FIELD

The present invention relates to a positive electrode for a lithium ion secondary battery, a positive electrode sheet for a lithium ion secondary battery, and a method for manufacturing the same.

BACKGROUND ART

In recent years, in light of environmental problems, interest in electric vehicles or hybrid vehicles has increased, and technical demands for higher energy density and higher capacity of a secondary battery, which is a driving source, are further increased.

An electrode for such a secondary battery is produced from an electrode sheet obtained by applying and drying a slurry which includes an active material on a strip-shaped metal foil such as aluminum and copper. A method for applying the active material can be roughly divided into an intermittent coating method and a continuous coating method.

As a structure which suppresses electrical contact between an exposed positive electrode foil portion and a negative electrode due to heat shrinkage of a separator of a lithium ion secondary battery, Patent Documents 1 to 15, and the like disclose a configuration in which an insulating layer is provided at the end of the electrode. Among these, Patent Documents 8, 11, and 13 to 15 have an insulating layer including a conductive material.

The electrode used in the secondary battery designed to have a high energy density tends to be designed to have a thin metal foil as a current collector. On the other hand, in order to further increase the capacity, a thickness of the active material portion has been increased.

RELATED DOCUMENTS

Patent Documents

[Patent Document 1] Japanese Patent Application Publication No. 2016-186945
[Patent Document 2] Japanese Patent Application Publication No. 2004-259625
[Patent Document 3] Japanese Patent Application Publication No. 2012-204334
[Patent Document 4] Japanese Patent Application Publication No. H10-74535
[Patent Document 5] PCT Japanese Translation Patent Publication No. 2005-509247
[Patent Document 6] Japanese Patent Application Publication No. 2003-151535
[Patent Document 7] Japanese Patent Application Publication No. 2006-147392
[Patent Document 8] Japanese Patent Application Publication No. 2012-114079
[Patent Document 9] Japanese Patent Application Publication No. 2012-74359
[Patent Document 10] PCT Japanese Translation Patent Publication No. 2009-518808
[Patent Document 11] Japanese Patent Application Publication No. 2009-238487
[Patent Document 12] Japanese Patent Application Publication No. 2011-81920
[Patent Document 13] Japanese Patent Application Publication No. 2007-095656
[Patent Document 14] Japanese Patent Application Publication No. 2012-178326
[Patent Document 15] International publication WO2012/128160

SUMMARY OF THE INVENTION

Problem to be Solved

However, in a case where an insulating material is applied after coating a thick film, since a gap between a tip of a coating equipment and a work cannot be narrowed, it is difficult to apply the insulating material so as to be a thin film. Therefore, there are problems such as an increase in the thickness of a cell, an increase in the cost of the insulating material, and a risk of cracking during drying, due to an increase in the thickness of an active material overlapping portion.

The present invention has been made in view of the above-described circumstances, and an object of the present invention is to provide a positive electrode for a lithium ion secondary battery, a positive electrode sheet for a lithium ion secondary battery, and a method for manufacturing the same, in which manufacturing costs can be reduced and high performance is expected.

Solution to Problem

In each aspect of the present invention, the following configurations are adopted in order to solve the above-described problems.

A first aspect relates to a positive electrode for a lithium ion secondary battery.

The positive electrode for a lithium ion secondary battery according to the first aspect includes:
 a current collector;
 a first mixture layer which is provided on at least one surface of the current collector and contains at least a positive electrode active material; and
 a second mixture layer which is partially covered by the first mixture layer and includes, as a main component, particles different from the positive electrode active material,
 in which the second mixture layer is provided on at least one end side of the first mixture layer in a boundary portion between a formed area where the first mixture layer is formed and a non-formed area where the first mixture layer is not formed,
 one end of the second mixture layer is positioned between the at least one surface of the current collector and a lower surface of the first mixture layer in the formed area of the first mixture layer, and the other end is positioned in the non-formed area, and the first mixture layer and the second mixture layer contain a dispersed conductive substance.

A second aspect relates to a positive electrode sheet for a lithium ion secondary battery.

A first positive electrode sheet for the lithium ion secondary battery according to the second aspect has
- a first mixture layer which contains at least a positive electrode active material, and
- a second mixture layer which is partially covered by the first mixture layer and includes, as a main component, particles different from the positive electrode active material formed, on both surfaces or one surface of a current collector, which is a strip-shaped sheet wound around a roll, continuously in a lengthwise direction of the sheet, and formed in parallel with each other and parallel to the lengthwise direction of the sheet, and at least one end of the first mixture layer on a widthwise direction side of the sheet is formed to cover a part of the second mixture layer.

A second positive electrode sheet for the lithium ion secondary battery according to the second aspect, has
- a first mixture layer which contains at least a positive electrode active material, and
- a second mixture layer which is partially covered by the first mixture layer and includes, as a main component, particles different from the positive electrode active material intermittently formed on both surfaces or one surface of a current collector, which is a strip-shaped sheet wound around a roll, and formed in a lengthwise direction of the sheet, in which the second mixture layer is provided on at least one end side of the first mixture layer in the lengthwise direction of the sheet in a boundary portion between a formed area where the first mixture layer is formed and a non-formed area where the first mixture layer is not formed, and one end of the second mixture layer is positioned between the at least one surface of the current collector and a lower surface of the first mixture layer in the formed area of the first mixture layer, and the other end is positioned in the non-formed area.

A third aspect relates to a method for manufacturing a positive electrode sheet for a lithium ion secondary battery, which is executed by at least one computer.

A first method for manufacturing a positive electrode sheet for a lithium ion secondary battery according to the third aspect includes at least, in the following order:
- a step (A1) of continuously applying a mixture, which contains any one conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4), to a part of both surfaces or one surface of a current collector, which is a strip-shaped sheet wound around a roll, in a lengthwise direction of the sheet;
- a step (B1) of continuously applying a paste-like mixture (P) containing at least a positive electrode active material and a dispersion medium to the lengthwise direction of the sheet; and
- a step (C) of solidifying a formation by drying,
- in which, in the step (B1), the mixture (P) is applied so as to overlap both of a portion including one end, of an area where the mixture containing the conductive substance (M) has been applied in the step (A1), in a widthwise direction of the sheet, and a portion where the mixture containing the conductive substance (M) is not applied, and so as not to overlap a portion including the other end, of the area where the mixture containing the conductive substance (M) has been applied, in the widthwise direction of the sheet.

A second method for manufacturing a positive electrode sheet for a lithium ion secondary battery according to the third aspect includes at least, in the following order:
- a step (A2) of intermittently applying a mixture, which contains anyone conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4), to a part of both surfaces or one surface of a current collector, which is a strip-shaped sheet wound around a roll, in a lengthwise direction of the sheet;
- a step (B2) of intermittently applying a paste-like mixture (P) containing at least a positive electrode active material and a dispersion medium to the lengthwise direction of the sheet; and
- a step (C) of solidifying a formation by drying,
- in which, in the step (B2), the mixture (P) is applied so as to overlap both of a portion including one end, of an area where the mixture containing the conductive substance (M) has been applied in the step (A2), in a lengthwise direction of the sheet, and a portion where the mixture containing the conductive substance (M) is not applied, and so as not to overlap a portion including the other end, of the area where the mixture containing the conductive substance (M) has been applied, in the lengthwise direction of the sheet.

Other aspects of the present invention may include a program which causes at least one computer to execute any method of the third aspect, or a computer-readable recording medium which records such a program. This recording medium includes a non-transitory tangible medium.

This computer program includes a computer program code which, when executed by a computer, causes the computer to perform, on a device for manufacturing a positive electrode sheet for a lithium ion secondary battery, the method for manufacturing the positive electrode sheet.

Any combination of the above-described components and a conversion of the expression of the present invention between methods, devices, systems, recording media, computer programs, and the like are also valid as an aspect of the present invention.

In addition, various components of the present invention are not necessarily individually independent, and a plurality of the components may be formed as one member, one component may be formed of a plurality of members, a certain component may be a part of another component, or a part of a certain component overlaps with a part of another component.

In addition, a plurality of procedures are described in an order in the method and computer program of the present invention, but the order of description does not limit the order in which the plurality of procedures are performed. Therefore, in a case of performing the method and computer program of the present invention, the order of the plurality of procedures can be changed within a range which does not hinder the contents.

Further, the plurality of procedures of the method and computer program of the present invention are not limited to being performed at different timings. Therefore, one procedure may occur during the performing of another procedure, or a part or all of a performing timing of one procedure may overlap with a performing timing of another procedure.

Advantageous Effects of Invention

According to each of the above-described aspects, it is possible to provide a positive electrode for a lithium ion secondary battery, a positive electrode sheet for a lithium ion secondary battery, and a method for manufacturing the same, in which manufacturing costs can be reduced and high performance is expected.

BRIEF DESCRIPTION OF THE DRAWINGS

FIGS. 7A1, 7A2, 7B1, 7B2, 7C1 and 7C2 explain a manufacturing process of the electrode sheet in FIG. 5.

FIGS. 9A1, 9A2, 9A3, 9B1, 9B2 and 9B3 show a procedure of a method for manufacturing an electrode sheet of Example 1 and Comparative Example 1.

DESCRIPTION OF EMBODIMENTS

Figure 1:
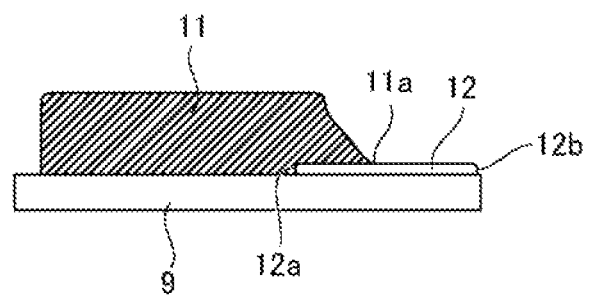
FIG. 1 shows a partial cross-sectional view of an electrode sheet for explaining a configuration of a positive electrode for a lithium ion secondary battery according to a first embodiment.

Hereinafter, embodiments of the present invention will be described with reference to the drawings. In all drawings, the same components are denoted by the same reference numerals, and description thereof will not be repeated where appropriate.

First Embodiment

An electrode according to the present embodiment is a positive electrode for a lithium ion secondary battery. FIG. 1 is a partial cross-sectional view of an electrode sheet 10 for explaining a configuration of a positive electrode for a lithium ion secondary battery according to the present embodiment. The positive electrode for a lithium ion secondary battery is produced by being cut out from the electrode sheet 10 in FIG. 2. FIG. 1 is a cross-sectional view taken along a line I-I when the electrode sheet 10 in FIG. 2 is viewed from a direction of an arrow I.

The positive electrode for a lithium ion secondary battery according to the present embodiment includes a current collector (hereinafter, also referred to as a metal foil 9), a first mixture layer 11 which is provided on at least one surface of the current collector (metal foil 9) and contains at least a positive electrode active material, and a second mixture layer 12 which is partially covered by the first mixture layer 11 and includes, as a main component, particles different from the active material. The second mixture layer 12 is provided on at least one end 11a side of the first mixture layer 11 in a boundary portion 19 between a formed area (hereinafter, also referred to as a coated area 15) where the first mixture layer 11 is formed and a non-formed area (hereinafter, also referred to as a non-coated area 17) where the first mixture layer 11 is not formed. One end 12a of the second mixture layer 12 is positioned between the at least one surface of the metal foil 9 and a lower surface of the first mixture layer 11 in the coated area 15 of the first mixture layer 11, and the other end 12b is positioned in the non-coated area 17. The first mixture layer 11 and the second mixture layer 12 contain a dispersed conductive substance.

Figure 2:
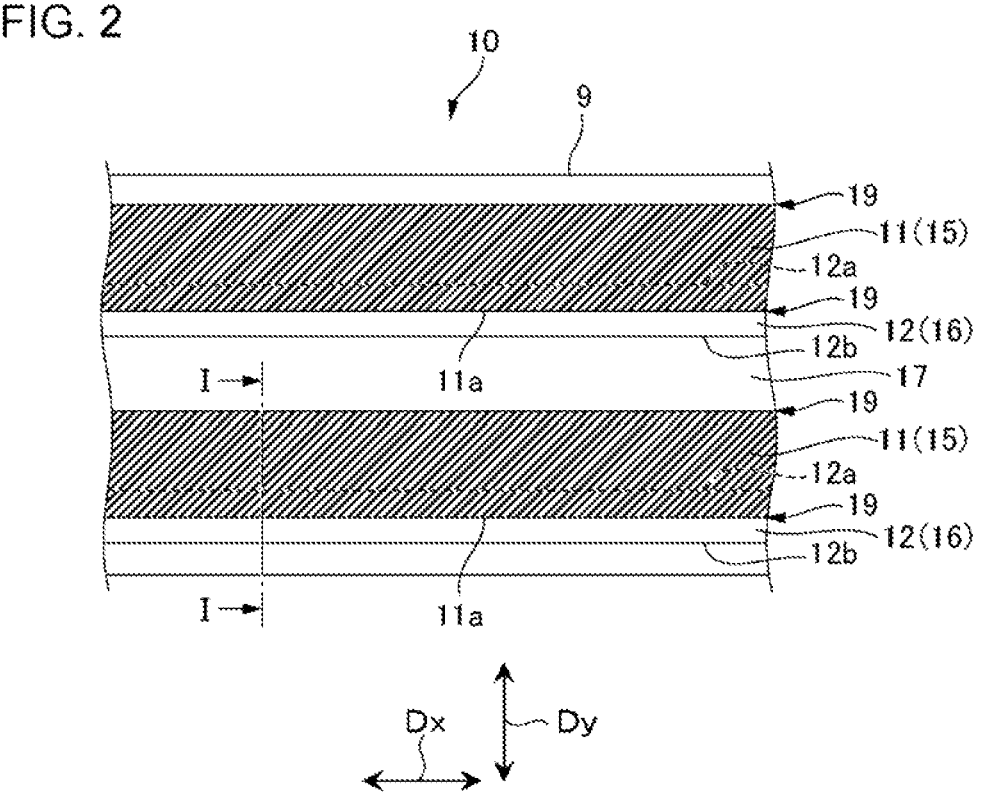
FIG. 2 shows a top view of the electrode sheet in FIG. 1.

FIG. 2 is a top view of the electrode sheet 10 according to the embodiment of the present invention. In the present embodiment, a case where the electrode sheet 10 is produced by a continuous coating method will be described as an example, but the method for producing the electrode sheet 10 may be an intermittent coating method as described later, and is not limited thereto. In the electrode sheet 10, the first mixture layer 11 and the second mixture layer 12 are formed on at least one surface of the strip-shaped metal foil 9 while the electrode sheet 10 is conveyed in a lengthwise direction Dx.

The electrode sheet 10 according to the present embodiment includes the first mixture layer 11 which contains at least a positive electrode active material and the second mixture layer 12 which is partially covered by the first mixture layer 11 and includes, as a main component, particles different from the active material, in which the first mixture layer 11 and the second mixture layer 12 are formed at both surfaces or one surface of the current collector (metal foil 9), which is a strip-shaped sheet wound around a roll of a coating device, and the first mixture layer 11 and the second mixture layer 12 are formed continuously in the lengthwise direction Dx of the electrode sheet 10, and are formed in parallel with each other and parallel to the lengthwise direction Dx of the electrode sheet 10.

At least one end 11a of the first mixture layer 11 on a widthwise direction Dy side of the electrode sheet 10 is formed to cover a part of the second mixture layer 12.

<Configuration of Electrode>

Hereinafter, a configuration of the electrode will be described in detail. The electrode according to the present embodiment is a positive electrode for a lithium ion battery.

The first mixture layer 11 contains an electrode active material, and as necessary, a binding agent such as a binder resin, a conductive auxiliary agent, a thickener, and the like.

The electrode active material contained in the first mixture layer 11 is not particularly limited as long as it is a normal positive electrode active material which can be used for a positive electrode of a lithium ion battery. Examples thereof include composite oxides of lithium and a transition metal such as lithium-nickel composite oxide, lithium-cobalt composite oxide, lithium-manganese composite oxide, lithium-nickel-manganese composite oxide, lithium-nickel-cobalt composite oxide, lithium-nickel-aluminum composite oxide, lithium-nickel-cobalt-aluminum composite oxide, lithium-nickel-manganese-cobalt composite oxide, lithium-nickel-manganese-aluminum composite oxide, and lithium-nickel-cobalt-manganese-aluminum composite oxide; transition metal sulfides such as $TiS_2$, FeS, and $MoS_2$; transition metal oxides such as MnO, $V_2O_5$, $V_6O_{13}$, and $TiO_2$; and olivine-type lithium phosphorus oxides.

The olivine-type lithium phosphorus oxide includes, for example, at least one element from the group consisting of Mn, Cr, Co, Cu, Ni, V, Mo, Ti, Zn, Al, Ga, Mg, B, Nb, and Fe, lithium, phosphorus, and oxygen. In order to improve its properties, these compounds may be those in which some elements are partially replaced with other elements.

Among these, olivine-type lithium iron phosphorus oxide, lithium-nickel composite oxide, lithium-cobalt composite oxide, lithium-manganese composite oxide, lithium-nickel-manganese composite oxide, lithium-nickel-cobalt composite oxide, lithium-nickel-aluminum composite oxide, lithium-nickel-cobalt-aluminum composite oxide, lithium-nickel-manganese-cobalt composite oxide, lithium-nickel-manganese-aluminum composite oxide, or lithium-nickel-cobalt-manganese-aluminum composite oxide is preferable. In addition to having a high action potential, these positive electrode active materials have a large capacity and a large energy density.

As the positive electrode active material, only one kind may be used alone, two or more kinds may be used in combination.

The content of the positive electrode active material is preferably 85 parts by mass or more and 99.8 parts by mass or less, in a case where the total amount of the first mixture layer 11 is 100 parts by mass. In addition, the density of the first mixture layer 11 is 3.40 g/cm³ or more.

The binder resin contained in the first mixture layer 11 is appropriately selected depending on the intended use application. For example, a fluorine-based binder resin which is soluble in a solvent, an aqueous binder which is dispersible in water, and the like can be used.

The fluorine-based binder resin is not particularly limited as long as electrode-molded is possible and sufficient electrochemical stability is provided, and examples thereof include a polyvinylidene fluoride-based resin and a fluoro-rubber. These fluorine-based binder resins may be used alone or in combination of two or more thereof. Among these, a polyvinylidene fluoride-based resin is preferable. The fluorine-based binder resin can be used, for example, by dissolving the fluorine-based binder resin in a solvent such as N-methyl-pyrrolidone (NMP).

The aqueous binder is not particularly limited as long as electrode-molded is possible and sufficient electrochemical stability is provided, and examples thereof include a polytetrafluoroethylene-based resin, a polyacrylic acid-based resin, a styrene-butadiene-based rubber, and a polyimide-based resin. These aqueous binders may be used alone or in combination of two or more thereof. Among these, a styrene-butadiene-based rubber is preferable.

In the present embodiment, the aqueous binder refers to a binder which can be dispersed in water to form an emulsion aqueous solution.

In a case where the aqueous binder is used, a thickener can be further used. The thickener is not particularly limited, and examples thereof include water-soluble polymers such as cellulose-based polymers such as carboxymethyl cellulose, methyl cellulose, and hydroxypropyl cellulose, and ammonium salts and alkali metal salts thereof; polycarboxylic acid; polyethylene oxide; polyvinylpyrrolidone; polyacrylates such as sodium polyacrylate; and polyvinyl alcohols.

The content of the binder resin is preferably 0.1 parts by mass or more and 10.0 parts by mass or less, in a case where the total amount of the first mixture layer 11 is 100 parts by mass. In a case where the content of the binder resin is within the above-described range, a balance between coatability of an electrode slurry, binding property of a binder, and battery characteristics are more excellent.

In addition, in a case where the content of the binder resin is the above-described upper limit value or less, a proportion of the electrode active material is increased, so that a capacity per electrode mass is increased, which is preferable. In a case where the content of the binder resin is the above-described lower limit value or more, electrode peeling is suppressed, which is preferable.

The content of the conductive auxiliary agent is preferably 0.1 parts by mass or more and 5.0 parts by mass or less, in a case where the total amount of the first mixture layer 11 is 100 parts by mass. In a case where the content of the conductive auxiliary agent is within the above-described range, a balance between coatability of an electrode slurry, binding property of a binder, and battery characteristics are more excellent.

In addition, in a case where the content of the conductive auxiliary agent is the above-described upper limit value or less, a proportion of the electrode active material is increased, so that a capacity per electrode mass is increased, which is preferable. In a case where the content of the conductive auxiliary agent is the above-described lower limit value or more, conductivity of the electrode is better, which is preferable.

The conductive substance dispersed in the first mixture layer 11 and the second mixture layer 12 may be the same type.

The conductive substance contained in the first mixture layer 11 and the second mixture layer 12 preferably includes at least one or more types of carbon materials selected from carbon nanotube, carbon nanohorn, graphene, carbon nanobrush, carbon black, acetylene black, and Ketjenblack.

The resistivity of the second mixture layer 12 is preferably in a range of 1 time or more and 100 times or less of the resistivity of the first mixture layer 11. In a case of being less than 1 time, in the lithium ion secondary battery, it is not possible to cause a gentle discharge. In addition, in a case of being more than 100 times, an insulating effect is poor, and in the lithium ion secondary battery, the original effect of suppressing a current between an exposed portion of the metal foil 9 of the positive electrode and a negative electrode is not achieved.

Further, the conductive substance dispersed in the second mixture layer 12 is contained in an amount of 0.1 parts by mass or more and 20.0 parts by mass or less with respect to the total amount of the second mixture layer 12. In a case of being less than 0.1 parts by mass, in the lithium ion secondary battery, it is not possible to cause a gentle discharge. In addition, in a case of being more than 20.0 parts by mass, an insulating effect is poor, and in the lithium ion secondary battery, the original effect of suppressing a current between an exposed portion of the metal foil 9 of the positive electrode and a negative electrode is not achieved.

The second mixture layer 12 may further contain a dispersed binding agent. The amount of the binding agent contained in the second mixture layer 12 is preferably 0.5 parts by mass or more and 60 parts by mass or less with respect to the total amount of the second mixture layer 12.

In a case of being less than 0.5 parts by mass, which is the lower limit of the proportion of the binding agent contained in the second mixture layer 12 to the total amount of the second mixture layer 12, binding property between the second mixture layer 12 and the metal foil 9 which is the current collector cannot be maintained. In a case of being more than 60 parts by mass, which is the upper limit of the proportion of the binding agent of the second mixture layer 12, viscosity is too high, which causes coating to be difficult. In addition, even when the coating is completed, in a case where the first mixture layer 11 and the second mixture layer 12 are simultaneously dried and solidified, the binder on the second mixture layer 12 side may diffuse on the first mixture layer 11 side, and as a result, the resistance of the first mixture layer 11 is too high, which may affect output characteristics and the like of the battery.

The thickness of the first mixture layer 11 is not particularly limited, and can be appropriately set according to desired characteristics. For example, from the viewpoint of energy density, the thickness can be set thick, and from the viewpoint of output characteristics, the thickness can be set thin. For example, the thickness (thickness on one surface) of the first mixture layer 11 can be appropriately set in a range of 10 μm or more and 250 μm or less, preferably 20 μm or more and 200 μm or less, and more preferably 30 μm or more and 150 μm or less.

The maximum thickness of the second mixture layer 12 is preferably thinner than the minimum thickness of the first mixture layer 11. The average thickness of the second mixture layer 12 is preferably in a range of 3 μm or more and 90% or less of an average thickness of the first mixture layer 11.

In a case where the thickness of the second mixture layer 12 is less than 3 μm, a film thickness is too thin, so that the original function of suppressing an electrical contact between the exposed portion of the metal foil 9 of the positive electrode and the negative electrode cannot be sufficiently maintained. In a case where the thickness of the second mixture layer 12 is more than 90% of that of the first mixture layer 11, when the first mixture layer 11 is applied, a level difference is too large at a boundary portion of the end of the second mixture layer 12, so that a gap between a tip of a coating equipment and a work does not fall within a proper range for coating a uniform film thickness.

The density of the second mixture layer 12 is preferably in a range of 0.5 g/cm$^3$ or more and 3.0 g/cm$^3$ or less. More preferably, the density of the second mixture layer 12 is in a range of 0.7 g/cm$^3$ or more and 2.8 g/cm$^3$ or less.

In a case where the density of the second mixture layer 12 is less than 0.5 g/cm$^3$, porosity of the second mixture layer 12 is too large, so that, when heat shrinkage of a separator of the battery occurs, the original function of suppressing the electrical contact between the exposed portion of the metal foil 9 of the positive electrode and the negative electrode cannot be sufficiently maintained. In a case where the density of the second mixture layer 12 is more than 3.0 g/cm$^3$, conductivity of lithium ions passing through the mixture layer deteriorates, so that battery characteristics in a steady state are not secured.

From the viewpoint of suppressing side reactions during charging and discharging and suppressing the decrease in charging and discharging efficiency, the average particle size of the electrode active material contained in the first mixture layer 11 is preferably 1 μm or more and more preferably 2 μm or more, and from the viewpoint of input and output characteristics and electrode production (such as smoothness of a surface of the electrode), the average particle size thereof is preferably 100 μm or less and more preferably 50 μm or less. Here, the average particle size means a particle size (median diameter: D50) at an integrated value of 50% in a particle size distribution (volume basis) by a laser diffraction/scattering method.

The average particle size of particles contained in the second mixture layer 12 as a main component is preferably in a range of 0.1 μm or more and 3.0 μm or less. In addition, proportions of particles having a particle size of 0.2 μm or less and particles having a particle size of 2 μm or more are each preferably 10% by volume or less.

The particles contained in the second mixture layer 12 as a main component are particles including one or more materials selected from alumina, silica, a thermoplastic resin, an ionizing radiation-curable resin, a thermosetting resin, and an insulating ink.

The binding agent contained in the second mixture layer 12 is of the same type as the binding agent contained in the first mixture layer 11, and the proportion of the binding agent contained in the second mixture layer 12 to the total amount of the second mixture layer 12 is preferably larger than the proportion of the binding agent contained in the first mixture layer 11 to the total amount of the first mixture layer 11.

The current collector layer (metal foil 9) according to the present embodiment is not particularly limited, and aluminum, stainless steel, nickel, titanium, or alloys thereof can be used. Examples of a shape thereof include a foil, a flat plate, and a mesh. In particular, any one of aluminum foil, aluminum alloy foil, or iron-stainless steel alloy foil can be preferably used. In addition, the thickness of the metal foil 9 is preferably 12 μm or less.

<Method for Manufacturing Electrode Sheet 10>

Figure 3:
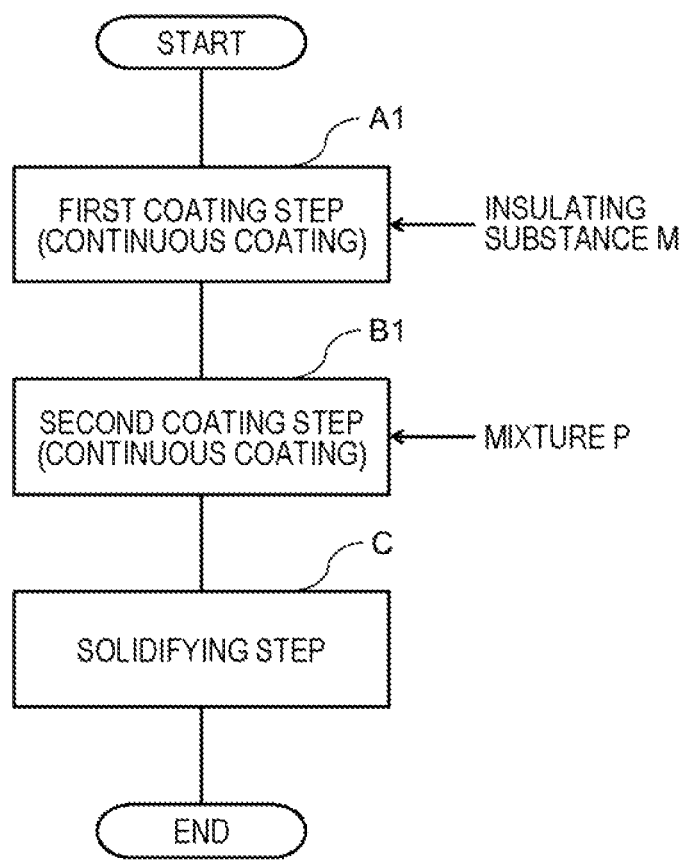
FIG. 3 shows a flowchart showing an example of a procedure of a method for manufacturing the electrode sheet in FIG. 1.

FIG. 3 is a flowchart showing an example of a procedure of a method for manufacturing the electrode sheet 10 according to the present embodiment. The method for manufacturing the electrode sheet 10 includes, in the following order, at least a first coating step (A1), a second coating step (B1), and a solidifying step (C).

Although a manufacturing system of the electrode sheet 10 is not shown, the manufacturing system mainly includes a coating device and a drying device. The coating device includes a roller which winds up a sheet of the metal foil 9 and conveys the metal foil 9 in the lengthwise direction Dx of the sheet, and at least two die coaters which apply a paste-like or slurry-like mixture forming the first mixture layer 11 and the second mixture layer 12 to at least one surface of the metal foil 9, respectively.

The roller and die coaters of the coating device are controlled by a control device (computer described later) (not shown), and each step of the method for manufacturing the electrode sheet 10 according to the present embodiment is realized.

In the first coating step A1, a mixture forming the second mixture layer 12 is continuously applied to a part of both surfaces or one surface of the current collector (metal foil 9), which is a strip-shaped sheet wound around a roll of a manufacturing device, in the lengthwise direction Dx of the sheet of the metal foil 9. The second mixture layer 12 is formed by this step A1. This mixture contains anyone conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4).

In the second coating step B1 following the first coating step A1, a paste-like mixture (P) containing at least a positive electrode active material and a dispersion medium is continuously applied to the sheet of the metal foil 9 in the lengthwise direction Dx of the sheet. The first mixture layer 11 is formed by this step B1. In the solidifying step C following the second coating step B1, formations (the first mixture layer 11 and the second mixture layer 12) are solidified by drying.

In the step B1, the mixture (P) is applied so as to overlap both of a portion including one end, of an area 16 where the mixture containing the conductive substance (M) has been applied in the step A1, in the widthwise direction Dy of the sheet of the metal foil 9, and a portion where the mixture containing the conductive substance (M) is not applied, and so as not to overlap a portion including the other end 12b, of the area 16 where the mixture containing the conductive substance (M) has been applied, in the widthwise direction Dy of the sheet of the metal foil 9.

In addition, in the step C, the mixture containing the conductive substance (M) and the mixture (P) are simultaneously solidified.

Here, a method for preparing an electrode slurry applied to form the first mixture layer 11 will be described.

The electrode slurry can be prepared by mixing an electrode active material, and as necessary, a binder resin, a conductive auxiliary agent, and a thickener. Since the blending ratio of the electrode active material, the binder resin, and the conductive auxiliary agent is the same as the content ratio of the electrode active material, the binder resin, and the conductive auxiliary agent in an electrode active material layer, description thereof will not be repeated.

The electrode slurry is obtained by dispersing or dissolving the electrode active material, and as necessary, the binder resin, the conductive auxiliary agent, and the thickener in a solvent.

A mixing procedure of each component is not particularly limited, and for example, the electrode slurry can be prepared by dry-mixing the electrode active material and the conductive auxiliary agent, then adding the binder resin and the solvent, and wet-mixing these.

At this time, as a mixer used, a known mixer such as a ball mill and a planetary mixer can be used, and the mixer is not particularly limited.

As the solvent used for the electrode slurry, an organic solvent such as N-methyl-2-pyrrolidone (NMP) or water can be used.

As a method of applying the electrode slurry on the current collector layer, a generally known method can be used. Examples thereof include a die coater method, a doctor blade method, an extrusion method, and a curtain method. Among these, from the viewpoint that it is possible to obtain a good surface condition of the coating layer in response to physical characteristics such as the viscosity and drying property of the electrode slurry, the die coater method is preferable.

In addition, a method of drying the electrode slurry applied on the current collector layer in the step C is not particularly limited, and examples thereof include a method of indirectly heating the electrode slurry from the current collector layer side or the already dried electrode active material layer side using a heating roll to dry the electrode slurry; a method of drying the electrode slurry using electromagnetic waves such as infrared, far-infrared, or near-infrared heater; and a method of indirectly heating the electrode slurry by applying hot air from the current collector layer side or the already dried electrode active material layer side to dry the electrode slurry.

A plurality of electrodes can be obtained by cutting the electrode sheet 10 produced by the above-described steps to a predetermined size. A means for cutting out the electrodes from the electrode sheet 10 is not particularly limited, and for example, the electrode sheet 10 can be cut using a blade made of metal or the like.

In the case of the electrode sheet 10 in FIG. 2, examples thereof include a method of cutting the electrode sheet 10 in parallel with the widthwise direction Dy and cutting out a plurality of electrodes having a predetermined width. Further, depending on the use application, the electrode for a battery can be obtained by punching the electrode sheet 10 to a predetermined dimension along a line in the direction Dx perpendicular to the cutting line so as to have a desired external dimension as a current collector.

Figure 4:
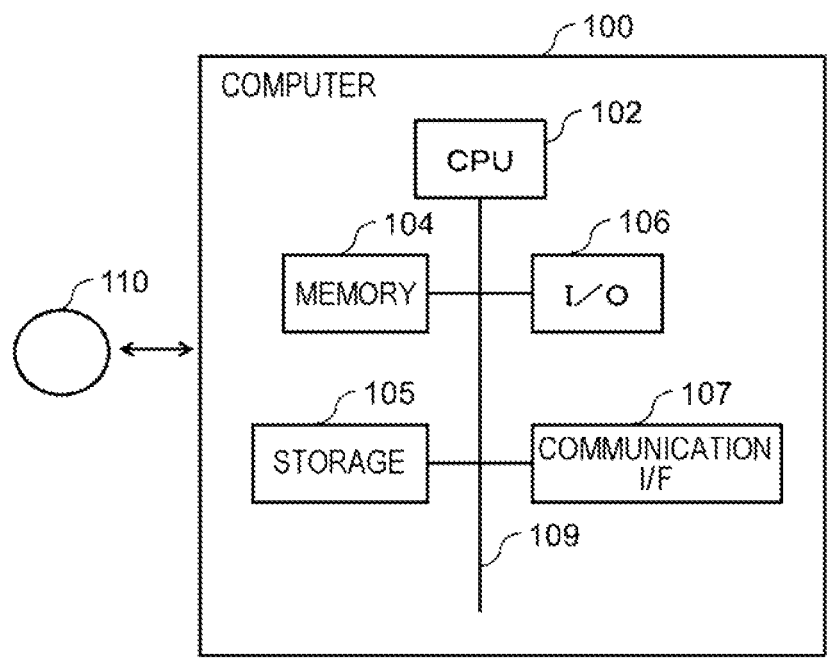
FIG. 4 shows a block diagram showing an example of a hardware configuration of a computer which realizes a control device for a manufacturing device of the electrode sheet in FIG. 1.

FIG. 4 is a block diagram showing an example of a hardware configuration of a computer 100 which realizes the control device for the manufacturing device of the electrode sheet according to the embodiment of the present invention.

Each control device is realized by at least one computer 100. The computer 100 includes a central processing unit (CPU) 102, a memory 104, a program 110 which realizes a control device loaded in the memory 104, a storage 105 which stores the program 110, an input/output (I/O) 106, and a communication interface (I/F) 107 for network connection. The CPU 102 and each element are connected to each other through a bus 109, and the entire computer 100 is controlled by the CPU 102. However, a method of connecting the CPU 102 and the like to each other is not limited to the bus connection.

In a case where the CPU 102 reads the program 110 stored in the storage 105 into the memory 104 and executes the program 110, each step of the method for manufacturing the electrode sheet 10 using the control device can be implemented.

The control device is configured with any combination of hardware and software of the computer 100. It is understood by those skilled in the art that there are various modifications of the configuration method and the device.

The program 110 may be recorded on a recording medium which can be read by the computer 100. The recording medium is not particularly limited, and various forms can be considered. In addition, the program may be loaded from the recording medium into the memory 104 of the computer 100, or may be downloaded to the computer 100 through a network and loaded into the memory 104.

The recording medium on which the program 110 is recorded includes a medium which can be used by the non-transitory tangible computer 100, and a program code which can be read by the computer 100 is embedded in the medium. When the program 110 is executed on the computer 100, the computer 100 is caused to execute the method for manufacturing the electrode sheet 10 which implements the control device.

As described above, according to the present embodiment, since the step A1 of forming the second mixture layer 12 is performed before the step A2 of forming the first mixture layer 11, the second mixture layer 12 can be formed as a thin film. Therefore, a material cost of the second mixture layer 12 can be suppressed, and occurrence of cracks in a case where the second mixture layer 12 is dried can be suppressed.

Figure 10A:
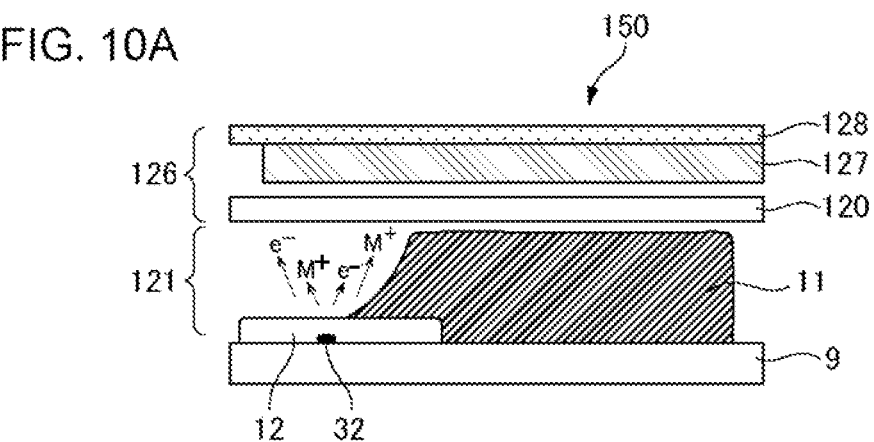
FIGS. 10A, 10B and 10C explain a case where a foreign matter is mixed in an electrode sheet of Example 2 and Comparative Example 2.
Figure 10B:
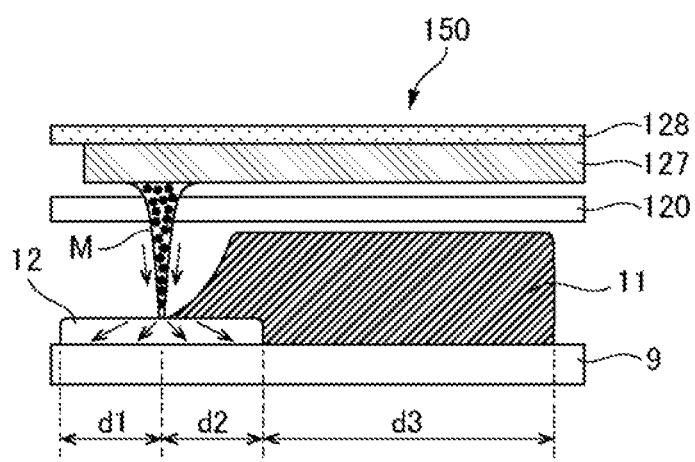

Further, according to the present embodiment, by including the conductive auxiliary agent in the second mixture layer 12, it is possible to give the second mixture layer 12 the same electric conductivity as the first mixture layer 11 and to form a current path in the second mixture layer 12. In addition, since the resistance of the second mixture layer 12 is lower than that of the first mixture layer 11, the current path from a negative electrode 126 to a positive electrode 121 tends to flow toward the second mixture layer 12. As a result, as shown in FIG. 10A, in a case where a metal foreign matter 32 is mixed in the second mixture layer 12 in the steps, the metal foreign matter 32 dissolves in an electrolytic solution as a metal ion ($M^+$) oxidized on a surface of a positive electrode current collector at the oxidation potential. When arriving at a negative electrode side, as shown in FIG. 10B, the metal ion is deposited as a metal (M) by a reduction reaction on a surface of the negative electrode at the reduction potential.

However, according to the present embodiment, even in a case where the deposited metal grows and penetrates a separator 120, when the deposited metal reaches the second mixture layer 12, a current path is formed in the entire second mixture layer 12 through a conductive material in the second mixture layer 12. Therefore, it is possible to cause a gentle discharge, and abnormal heat generation due to a local short circuit can be avoided.

Figure 10C:
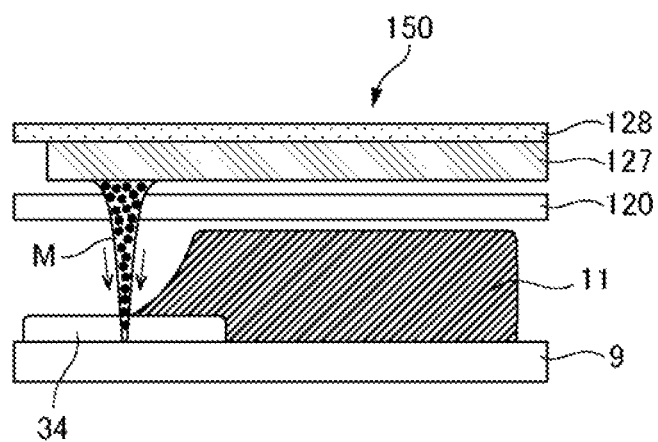

On the other hand, as shown in FIG. 10C, in a case where an insulating layer 34 is provided instead of the second mixture layer 12, when the deposited metal grows and penetrates the separator 120, the positive electrode 121 and the negative electrode 126 are connected, a short circuit occurs, and self-discharge failure occurs.

FIG. 10 shows an example that the foreign matter 32 is mixed in a range d1 in which only the second mixture layer 12 exists, but similarly, in a case where the foreign matter 32 is mixed in a range d2 in which the first mixture layer 11 and the second mixture layer 12 exist, or a range d3 in which only the first mixture layer 11 exists, according to the present embodiment, the positive electrode 121 and the negative electrode 126 are not connected, and the self-discharge failure does not occur.

In addition, in a case where an overlapping portion of the second mixture layer 12 and the first mixture layer 11 is not conductive, the overlapping portion does not contribute to a charging and discharging reaction, so that the capacity of the battery is effectively reduced. In the present embodiment, this problem can be solved by that the first mixture layer 11 and the second mixture layer 12 have conductivity.

In addition, in the example of Patent Document 13, in order to surely overlap an exposed area of the current collector with a protective layer, it is necessary that the protective layer is applied to the active material layer to some extent. However, in the presence of the active material layer, the die for forming the protective layer cannot be sufficiently brought close to the foil, so that a thin film cannot be formed.

In addition, in a case where a masking tape is attached to the active material layer side, when the masking tape is peeled off after the protective layer has been applied, the active material layer itself is peeled off from the current collector. Therefore, the masking tape cannot be attached to the active material layer side, and considering stability and variation of devices used for coating, it is necessary that the area of the protective layer over the active material layer is set large. In addition, the area of the protective layer over the active material layer varies greatly depending on manufacturing conditions such as meandering of the foil during coating and misalignment of the coating device. Therefore, the protective layer is formed not only on an inclined portion at the end of the active material layer but also on an inner portion of the active material layer.

Further, in a case of, after forming the active material layer, attaching the masking tape and applying the protective layer to the end of the active material layer, there is a large level difference or slope at a coated area, which includes a boundary between the masking tape and the foil and a boundary between the active material layer and the foil, so that the thickness of the protective layer tends to vary and liquid pool occurs, resulting in an unnecessarily thick protective layer applied.

In a case where a large number of electrodes designed with such a configuration are laminated, an increase in thickness (level difference) in a laminated direction occurs locally only in an area formed by overlapping the protective layer with the active material layer. That is, the film thickness of the entire battery is not uniform, and only a portion with the protective layer protrudes in the thickness direction.

On the other hand, in the manufacturing process and usage process of the lithium ion battery, problems such as gas removal not being performed and non-uniform charging and discharging reaction occur due to the fact that the batteries are not pressed uniformly in a laminated direction. In addition, in the portion where there is a large level difference or slope at a coated area, which includes a boundary between the masking tape and the foil and a boundary between the active material layer and the foil, the liquid pool has occurred at the time of applying the protective layer as described above, so that drying does not proceed sufficiently only in the portion. Therefore, dispersion of the binder toward the vicinity of the foil does not proceed and peeling strength becomes weak, and the protective layer may be peeled off in the subsequent process or when the battery is used.

In addition, as another problem that occurs in the post-process while the protective layer is not sufficiently dried due to the formation of the liquid pool portion in the protective layer, since the conductive auxiliary agent has a property of being more easily aggregated than a filler (alumina or the like), only the conductive auxiliary agent is aggregated, and resistance variation in the protective layer is likely to occur. That is, the conductive auxiliary agent is easily distributed only on the surface of the protective layer, and due to the thick film thickness, electrical conduction does not occur in the film thickness direction. Therefore, when the conductive auxiliary agent is deposited from the negative electrode and reaches the protective layer on the positive electrode, it is difficult to form a current path in the entire protective layer through the conductive material in the protective layer, and the effect of causing a gentle discharge and avoiding abnormal heat generation due to a local short circuit cannot be sufficiently obtained.

When the masking tape is removed, there is also a problem that the protective layer formed on the surface of the current collector foil is also peeled off together with the masking tape. In addition, there is a risk that the second mixture layer 12 may not be completely formed on the exposed foil portion of the positive electrode facing the negative electrode due to misalignment at the time of attaching the masking tape.

In the present embodiment, since the conductive second mixture layer 12 is formed before the first mixture layer 11, even in the second mixture layer 12 having a thin film thickness, the second mixture layer 12 can be formed with a uniform thickness while controlling the coating position with high certainty and high accuracy. In addition, the conductive auxiliary agent in the second mixture layer 12 is uniformly distributed, the conductivity in the thickness direction is maintained in any portion of the second mixture layer 12, and the resistance is kept below a certain level.

Even in the overlapping area of the first mixture layer 11 and the second mixture layer 12, the conductive auxiliary agent in the second mixture layer 12 is uniformly distributed and the film thickness is thin, so that electrons involved in the active material particles existing on the side distant from the current collecting foil in the first mixture layer 11 are also transmitted to the foil side through a conductive path in the second mixture layer 12. That is, the transfer resistance of electrons on the surface of the active material particles to the foil is reduced, and as a result, since the active material in such an overlapping area also contributes to the charging and discharging, a large battery capacity can be secured.

Since the conductivity in the thickness direction is maintained and the resistance is kept below a certain level in any portion of the second mixture layer 12, it is possible to cause a gentle discharge. Even in the overlapping area of the first mixture layer 11 and the second mixture layer 12, increase in film thickness is suppressed to a small extent, so that there is no local increase in thickness (level difference) when the electrodes are laminated, and the battery can be pressed uniformly. Therefore, in addition to being able to release sufficient gas from the inside of the battery during the manufacturing process, a uniform charging and discharging reaction occurs during the usage process, so that stable battery characteristics are secured.

Modified Aspect of First Embodiment

In the first embodiment, the example of producing the electrode sheet 10 by the method of continuously applying the electrode active material to the metal foil 9 has been described. As a modified aspect of the first embodiment, an example of producing an electrode sheet 10 by a method of intermittently applying the electrode active material to the metal foil 9 will be described.

Figure 5:
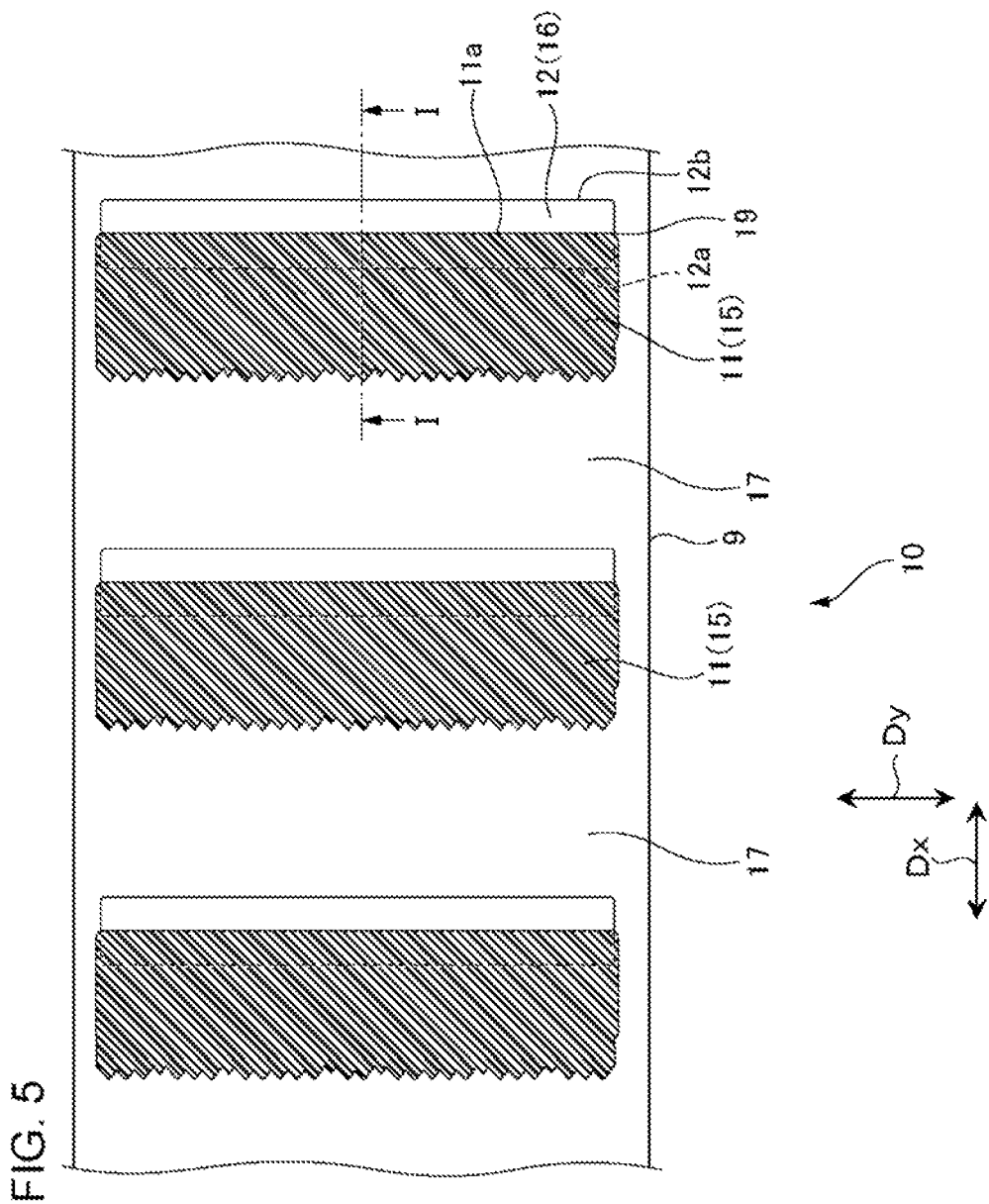
FIG. 5 shows a top view of the electrode sheet according to the first embodiment in a modified aspect.

FIG. 5 is a top view of the electrode sheet 10 according to the present modified aspect.
The electrode sheet 10 according to the present embodiment includes the first mixture layer 11 which contains at least a positive electrode active material and the second mixture layer 12 which is partially covered by the first mixture layer 11 and includes, as a main component, particles different from the active material, in which each of the first mixture layer 11 and the second mixture layer 12 is intermittently formed on both surfaces or one surface of the current collector (metal foil 9), which is a strip-shaped sheet wound around a roll, in the lengthwise direction Dx of the sheet of the metal foil 9, and with a predetermined width in the widthwise direction Dy of the metal foil 9.

The second mixture layer 12 is provided on at least one end 11a side of ends of the first mixture layer 11 in the lengthwise direction Dx of the sheet of the metal foil 9 in a boundary portion 19 between a formed area 15 where the first mixture layer 11 is formed and a non-formed area 17 where the first mixture layer 11 is not formed.

One end 12a of the second mixture layer 12 is positioned between the at least one surface of the metal foil 9 and a lower surface of the first mixture layer 11 in the formed area 15 of the first mixture layer 11, and the other end 12b is positioned in the non-formed area 17.

<Method for Manufacturing Electrode Sheet 10>

Figure 6:
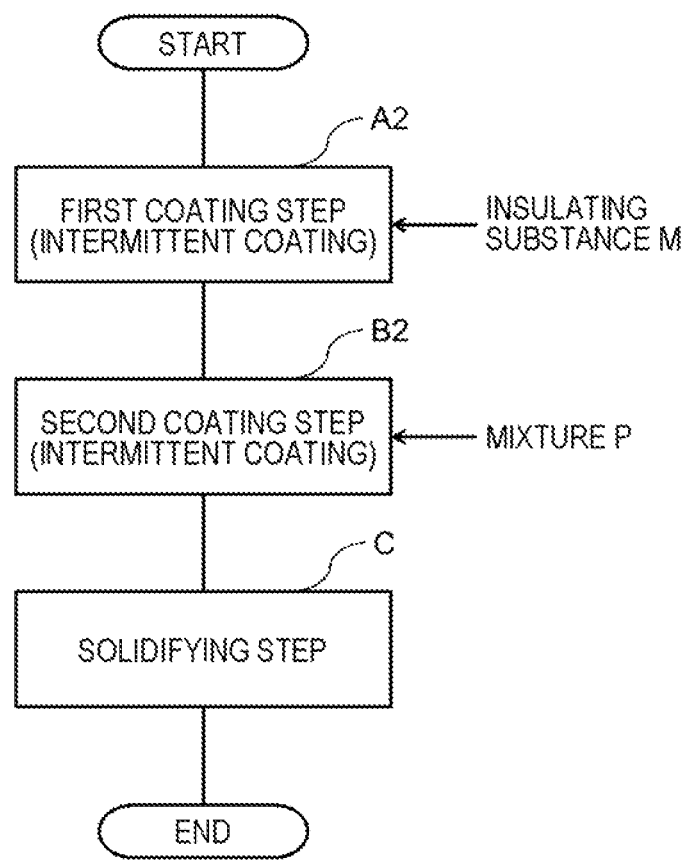
FIG. 6 shows a flowchart showing an example of a procedure of a method for manufacturing the electrode sheet in FIG. 5.

FIG. 6 is a flowchart showing an example of a procedure of a method for manufacturing the electrode sheet 10 according to the present modified aspect. The method for manufacturing the electrode sheet 10 includes, in the following order, at least a first coating step (A2), a second coating step (B2), and a solidifying step (C).

In the present modified aspect, a coating device same as the coating device of the first embodiment described above can be used, but the coating device of the present modified aspect is different from the first embodiment described above in arrangement of at least two die coaters on the electrode sheet 10 in which a paste-like or slurry-like mixture forming the first mixture layer 11 and the second mixture layer 12 is applied to at least one surface of the metal foil 9.

Next, each step will be described with reference to FIGS. 7A1, 7A2, 7B1, 7B2, 7C1 and 7C2.

FIGS. 7A2, 7B2, and 7C2 are cross-sectional views taken along a line II-II when the electrode sheets 10 in FIGS. 7A1, 7B1, and 7C1 are viewed from a direction of an arrow II.

First, the metal foil 9 is prepared in the coating device (FIGS. 7A1 and 7A2).

Next, in the first coating step A2, a mixture forming the second mixture layer 12 is intermittently applied to a part of both surfaces or one surface of the current collector (metal foil 9), which is a strip-shaped sheet wound around a roll of a manufacturing device, in the lengthwise direction Dx with a predetermined width in the widthwise direction Dy of the sheet. As shown in FIGS. 7B1 and 7B2, the second mixture layer 12 is formed by this step A2.

In FIGS. 7B1 and 7B2, an area of a broken line 15 represents the coated area 15 where the second mixture layer 12 is formed. As shown, the second mixture layer 12 is provided on the side of at least one end 11a of the coated area where the first mixture layer 11 is formed in a boundary portion 19 between the coated area 15 where the first mixture layer 11 is formed and the non-coated area 17 where the first mixture layer 11 is not formed.

The mixture for forming the second mixture layer 12 contains any one conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4).

In the second coating step B2 following the first coating step A2, a paste-like mixture (P) containing at least a positive electrode active material and a dispersion medium is intermittently applied to the sheet in the lengthwise direction Dx with a predetermined width in the widthwise direction Dy. As shown in FIGS. 7C1 and 7C2, the first mixture layer 11 is formed by this step B2.

In this step B2, the mixture (P) is applied so as to overlap both of a portion including one end 12a, of an area 16 where the mixture containing the conductive substance (M) has been applied in the step A2, in the lengthwise direction Dx of the metal foil 9, and a portion (non-coated area 17) where the mixture containing the conductive substance (M) is not applied, and so as not to overlap a portion including the other end 12b in the lengthwise direction Dx of the sheet in the area 16 where the mixture containing the conductive substance (M) has been applied.

In the solidifying step C following the second coating step B2, formations (the first mixture layer 11 and the second mixture layer 12) are solidified by drying. In this step C, the mixture containing the conductive substance (M) and the mixture (P) are simultaneously solidified.

As described above, the electrode sheet 10 of the present modified aspect can also have the same effect as that of the first embodiment.

The embodiments of the present invention have been described above with reference to the drawings, but these are examples of the present invention and various configurations other than the above can be adopted.

In addition, the present invention is not limited to the above-described embodiments, and modifications, improvements, and the like within the range in which the object of the present invention can be achieved are included in the present invention.

Hereinafter, a battery manufactured by using the positive electrode produced in the first embodiment will be described.

Figure 8:
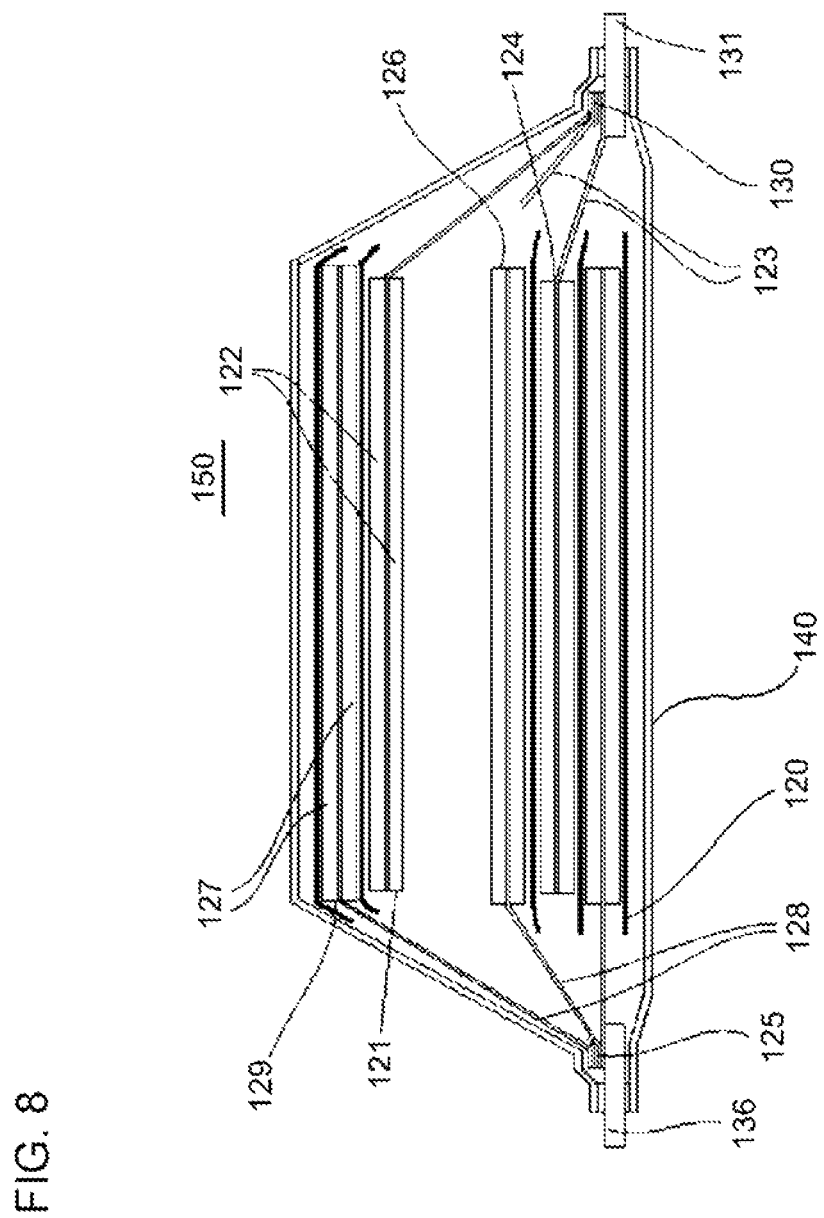
FIG. 8 shows a schematic view showing an example of a configuration of a battery according to an embodiment of the present invention.

FIG. 8 is a schematic view showing an example of a configuration of a battery 150 according to an embodiment of the present invention.

The battery according to the present embodiment includes a positive electrode produced from the electrode sheet 10 described in the above embodiment. Hereinafter, a case where the battery according to the present embodiment is a laminated battery 150 of a lithium ion battery will be described as a typical example.

The laminated battery 150 includes a battery element in which a positive electrode 121 and a negative electrode 126 are alternately laminated in a plurality of layers through a separator 120, and these battery elements are housed in a container formed of a flexible film 140 together with an electrolytic solution (not shown). A positive electrode terminal 131 and a negative electrode terminal 136 are electrically connected to the battery element, and a part or all of the positive electrode terminal 131 and the negative electrode terminal 136 are drawn out to the outside of the flexible film 140.

The positive electrode 121 is provided with a positive electrode active material coated portion (positive electrode active material layer 122) and a non-coated portion on each of the front and back surfaces of the positive electrode current collector layer 123, and the negative electrode 126 is provided with a negative electrode active material coated portion (negative electrode active material layer 127) and a non-coated portion on the front and back surfaces of the negative electrode current collector layer 128.

The non-coated portion of the positive electrode active material in the positive electrode current collector layer 123 is a positive electrode tab 130 for connecting the positive electrode active material to the positive electrode terminal 131, and the non-coated portion of the negative electrode active material in the negative electrode current collector layer 128 is a negative electrode tab 125 for connecting the negative electrode active material to the negative electrode terminal 136.

The positive electrode tabs 130 are grouped on the positive electrode terminal 131 and connected to each other by ultrasonic welding or the like together with the positive electrode terminal 131, and the negative electrode tabs 125 are grouped on the negative electrode terminal 136 and connected to each other by ultrasonic welding or the like together with the negative electrode terminal 136. One end of the positive electrode terminal 131 is drawn out to the outside of the flexible film 140, and one end of the negative electrode terminal 136 is also drawn out to the outside of the flexible film 140.

As described above, the second mixture layer 12 can be formed on a boundary portion 124 between the coated portion (coated area 15) (positive electrode active material layer 122) and the non-coated portion (non-coated area 17) of the positive electrode active material. In addition, one end of the second mixture layer 12 overlaps the coated portion (coated area 15) of the positive electrode active material (positive electrode active material layer 122), and the other end overlaps the positive electrode tab 130.

An insulating member can be formed at a boundary portion 129 between the coated portion of the negative electrode active material (negative electrode active material layer 127) and the non-coated portion as necessary, and the insulating member can be formed near the boundary portion between both the negative electrode tab 125 and the negative electrode active material.

Usually, external dimensions of the negative electrode active material layer 127 are larger than external dimensions of the positive electrode active material layer 122, and smaller than external dimensions of the separator 120.

(Non-Aqueous Electrolytic Solution Containing Lithium Salt)

A non-aqueous electrolytic solution containing a lithium salt used in the present embodiment can be appropriately selected from a known electrolytic solution according to the type of the electrode active material, the use application of the lithium ion battery, and the like.

Specific examples of the lithium salt include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlC_{14}$, $LiCl$, $LiBr$, $LiB(C_2H_5)_4$, $CF_3SO_3Li$, $CH_3SO_3Li$, $LiC_4F_9SO_3$, $Li(CF_3SO_2)_2N$, and lower fatty acid lithium carboxylate.

A solvent for dissolving the lithium salt is not particularly limited as long as it is usually used as a liquid for dissolving an electrolyte, and examples thereof include carbonates such as ethylene carbonate (EC), propylene carbonate (PC), butylene carbonate (BC), dimethyl carbonate (DMC), ethyl methyl carbonate (EMC), diethyl carbonate (DEC), methyl ethyl carbonate (MEC), and vinylene carbonate (VC); lactones such as y-butyrolactone and y-valerolactone; ethers such as trimethoxymethane, 1,2-dimethoxyethane, diethyl ether, tetrahydrofuran, and 2-methyltetrahydrofuran; sulfoxides such as dimethyl sulfoxide; dioxolanes such as 1,3-dioxolane and 4-methyl-1,3-dioxolane; nitrogen-containing solvents such as acetonitrile, nitromethane, formamide, and dimethylformamide; organic acid esters such as methyl formate, methyl acetate, ethyl acetate, butyl acetate, methyl propionate, and ethyl propionate; phosphate triesters and diglymes; triglymes; sulfolanes such as sulfolane and methylsulfolane; oxazolidinones such as 3-methyl-2-oxazolidinone; and sultones such as 1,3-propane sultone, 1,4-butane sultone, and naphthasultone. These may be used alone, or may be used in combination of two or more.

(Container)

In the present embodiment, a known member can be used for the container, and from the viewpoint of reducing weight of the battery, it is preferable to use the flexible film 140. As the flexible film 140, a film in which resin layers are provided on the front and back surfaces of a metal layer as a base material can be used. The metal layer can be selected to have a barrier property such as preventing leakage of the electrolytic solution and invasion of moisture from the outside, and aluminum, stainless steel, or the like can be used. A heat-sealing resin layer such as modified polyolefin is provided on at least one surface of the metal layer, the heat-sealing resin layers of the flexible film 140 are opposed to each other through the battery element, and the periphery of the portion housing the battery element is heat-sealed to form an exterior body. A resin layer such as a nylon film or a polyester film can be provided on the surface of the exterior body, which is the surface opposite to the surface on which the heat-sealing resin layer is formed.

(Terminal)

In the present embodiment, the positive electrode terminal 131 may be formed of aluminum or an aluminum alloy, and the negative electrode terminal 136 may be formed of copper or a copper alloy, or any one of them plated with nickel. Each terminal is drawn out to the outside of the container, and a heat-sealing resin can be provided in advance at a portion of each terminal located at a portion where the periphery of the exterior body is heat-sealed.

(Insulating Member)

In a case where an insulating member is formed at the boundary portion 129 between the coated portion and the non-coated portion of the active material, polyimide, glass fiber, polyester, polypropylene, or those containing these materials in the composition can be used. The insulating member can be formed by applying heat to these members to weld these members to the boundary portion 129, or by applying a gel-like resin to the boundary portion 129 and drying.

(Separator)

The separator 120 according to the present embodiment preferably includes a resin layer containing a heat-resistant resin as a main component.

Here, the above-described resin layer is formed of a heat-resistant resin as a main component. Here, the "main component" refers to that the proportion in the resin layer is 50% by mass or more, preferably 70% by mass or more, still more preferably 90% by mass or more, and may be 100% by mass.

The resin layer constituting the separator 120 according to the present embodiment may be a single layer or two or more types of layers.

Examples of the heat-resistant resin forming the above-described resin layer include one or two or more types selected from polyethylene terephthalate, polybutylene terephthalate, polyethylene naphthalate, poly-m-phenylene terephthalate, poly-p-phenylene isophthalate, polycarbonate, polyester carbonate, aliphatic polyamide, aromatic polyamide, semi-aromatic polyamide, aromatic polyester, polyphenylene sulfide, polyparaphenylene benzobisoxazole, polyimide, polyarylate, polyetherimide, polyamideimide, polyacetal, polyetheretherketone, polysulfone, polyethersulfone, fluororesin, polyether nitrile, and modified polyphenylene ether.

Among these, from the viewpoint of excellent balance of heat resistance, mechanical strength, elasticity, price, one or two or more selected from polyethylene terephthalate, polybutylene terephthalate, polyethylene naphthalate, aliphatic polyamide, wholly-aromatic polyamide, semi-aromatic polyamide, and wholly-aromatic polyester is preferable, one or two types or more selected from polyethylene terephthalate, polybutylene terephthalate, aliphatic polyamide, wholly-aromatic polyamide, and semi-aromatic polyamide is more preferable, one or two types or more selected from polyethylene terephthalate and wholly-aromatic polyamide is still more preferable, and polyethylene terephthalate is even more preferable.

The resin layer constituting the separator 120 according to the present embodiment is preferably a porous resin layer. As a result, in a case where an abnormal current is generated in the lithium ion battery, the battery temperature rises, and the like, micropores in the porous resin layer can be blocked to shield the current flow, and thermal runaway of the battery can be avoided.

From the viewpoint of balance between mechanical strength and lithium ion conductivity, the porosity of the above-described porous resin layer is preferably 20% or more and 80% or less, more preferably 30% or more and 70% or less, and particularly preferably 40% or more and 60% or less.

The porosity can be calculated from the following expression.

$$\varepsilon = \{1 - Ws/(ds \cdot t)\} \times 100$$

Here, $\varepsilon$: porosity (%), Ws: weight per area (g/m$^2$), ds: true density (g/cm$^3$), t: film thickness (μm).

A planar shape of the separator 120 according to the present embodiment is not particularly limited, and can be appropriately selected according to the shape of the electrode or the current collector, and for example, a rectangle.

From the viewpoint of balance between mechanical strength and lithium ion conductivity, the thickness of the separator 120 according to the present embodiment is preferably 5 μm or more and 50 μm or less.

As described above, an electrochemical device such as a battery can be assembled using a positive electrode produced from the electrode sheet 10 of any of the above-described embodiments.

EXAMPLES

Example 1

FIGS. 9A1 to 9A3 show a view showing a procedure of a method for manufacturing the electrode sheet 10 according to Example 1 of the present invention.

As shown in FIG. 9A1, in Example 1, as described with reference to FIGS. 3 and 6, first, the second mixture layer 12 was applied to at least one surface of the metal foil 9 by the step A1 or the step A2. Therefore, a position of a die coater 22 in the coating device of the second mixture layer 12 can be installed at a height h1 close to an upper surface of the metal foil 9. The position can be lower than a position of the die coater 22 in the coating device of a comparative example of FIG. 9B2, which will be described later, that is, a height h2.

Since the die coater 22 could be disposed close to the metal foil 9 in this way, as shown in FIG. 9A2, a thin film coating of the second mixture layer 12 could be performed.

As shown in FIG. 9A3, the first mixture layer 11 was formed by the step B1 or the step B2 to partially cover the thin film-formed second mixture layer 12.

As described above, since the second mixture layer 12 formed in Example 1 could be formed into a thin film, a material cost of the second mixture layer 12 could be suppressed, and occurrence of cracks when the second mixture layer 12 was dried could be suppressed.

Comparative Example 1

FIGS. 9B1 to 9B3 show a view showing a procedure of a method for manufacturing the electrode sheet 10 according to Comparative Example 1.

In Comparative Example 1, as shown in FIG. 9B1, the first mixture layer 11 was applied to the metal foil 9 before the second mixture layer 12. As shown in FIG. 9B2, the position (height h2) of the die coater 22 in the coating device was higher than the position (height h1) of Example 1 in FIG. 9A1 by the height of the first mixture layer 11, that is, was a position away from the metal foil 9. Therefore, as shown in FIG. 9B3, the film thickness of the second mixture layer 12 formed by Comparative Example 1 was thicker than that of the second mixture layer 12 formed by Example 1. Therefore, the material cost of the second mixture layer 12 became high, and cracks 30 were likely to occur when the second mixture layer 12 was dried.

Example 2

FIGS. 10A and 10B are views schematically showing cross-sectional views of a lithium ion secondary battery of Example 2, produced by using the positive electrode according to the present invention.

In the battery 150 of Example 2 shown in FIG. 10A, a positive electrode 121 having the second mixture layer 12 including the conductive substance of the present invention was used. As shown in FIG. 10A, in a case where a metal foreign matter 32 was mixed in the second mixture layer 12 in the steps, the metal foreign matter 32 dissolved in an electrolytic solution as a metal ion ($M^+$) oxidized on a surface of a positive electrode current collector at the oxidation potential. In a case of arriving at a negative electrode side, as shown in FIG. 10B, the metal ion was deposited as a metal (M) by a reduction reaction on a surface of the negative electrode at the reduction potential.

However, even in a case where the deposited metal grew and penetrated a separator 120, when the deposited metal reached the second mixture layer 12, a current path was formed in the entire second mixture layer 12 through a conductive material in the second mixture layer 12. Therefore, it is possible to cause a gentle discharge, and abnormal heat generation due to a local short circuit can be avoided.

Comparative Example 2

FIG. 10C is a view schematically showing cross-sectional views of a lithium ion secondary battery of Comparative Example 2, produced by using a positive electrode not having the second mixture layer 12. In a case where an insulating layer 34 was provided instead of the second mixture layer 12, when the deposited metal grew and penetrated the separator 120, the positive electrode 121 and the negative electrode 126 were connected, a short circuit occurred, and self-discharge failure occurred.

The present invention has been described with reference to the embodiments and Examples, but the present invention is not limited to the above-described embodiments and Examples. Various changes which can be understood by those skilled in the related art can be made within the scope of the present invention in terms of the structure and details of the present invention.

Hereinafter, examples of the reference aspect will be added.

1. A positive electrode for a lithium ion secondary battery, including:
   a current collector;
   a first mixture layer which is provided on at least one surface of the current collector and contains at least a positive electrode active material; and
   a second mixture layer which is partially covered by the first mixture layer and includes, as a main component, particles different from the positive electrode active material,
   in which the second mixture layer is provided on at least one end side of the first mixture layer in a boundary portion between a formed area where the first mixture layer is formed and a non-formed area where the first mixture layer is not formed,
   one end of the second mixture layer is positioned between the at least one surface of the current collector and a lower surface of the first mixture layer in the formed area of the first mixture layer, and the other end is positioned in the non-formed area, and
   the first mixture layer and the second mixture layer contain a dispersed conductive substance.

2. The positive electrode for a lithium ion secondary battery according to 1.,
   in which the conductive substance dispersed in the first mixture layer and the second mixture layer are the same type.

3. The positive electrode for a lithium ion secondary battery according to 1, or 2.,
   in which the conductive substance includes at least one or more types of carbon materials selected from carbon nanotube, carbon nanohorn, graphene, carbon nanobrush, carbon black, acetylene black, and Ketjenblack.

4. The positive electrode for a lithium ion secondary battery according to any one of 1. to 3.,
   in which a resistivity of the second mixture layer is in a range of 1 time or more and 100 times or less of a resistivity of the first mixture layer.

5. The positive electrode for a lithium ion secondary battery according to any one of 1. to 4.,
   in which the conductive substance dispersed in the second mixture layer is contained in an amount of 0.1 parts by mass or more and 20.0 parts by mass or less with respect to a total amount of the second mixture layer.

6. The positive electrode for a lithium ion secondary battery according to any one of 1. to 5.,
   in which the second mixture layer further contains a dispersed binding agent, and
   an amount of the binding agent contained in the second mixture layer is 0.5 parts by mass or more and 60 parts by mass or less with respect to a total amount of the second mixture layer.

7. The positive electrode for a lithium ion secondary battery according to any one of 1. to 5.,
   in which a maximum thickness of the second mixture layer is thinner than a minimum thickness of the first mixture layer.

8. The positive electrode for a lithium ion secondary battery according to any one of 1. to 7.,
   in which an average thickness of the second mixture layer is in a range of 3 μm or more and 90% or less of an average thickness of the first mixture layer.

9. The positive electrode for a lithium ion secondary battery according to any one of 1. to 8.,
   in which a density of the second mixture layer is in a range of 0.5 g/cm$^3$ or more and 3.0 g/cm$^3$ or less.

10. The positive electrode for a lithium ion secondary battery according to any one of 1. to 9.,
    in which an average particle size of the particles contained in the second mixture layer as a main component is in a range of 0.1 μmm or more and 3.0 μm or less.

11. The positive electrode for a lithium ion secondary battery according to any one of 1. to 10.,
    in which the particles contained in the second mixture layer as a main component include one or more materials selected from alumina, silica, a thermoplastic resin, an ionizing radiation-curable resin, a thermosetting resin, and an insulating ink.

12. The positive electrode for a lithium ion secondary battery according to any one of 6. to 11.,
    in which the binding agent contained in the second mixture layer is of the same type as a binding agent contained in the first mixture layer, and
    a proportion of the binding agent contained in the second mixture layer to a total amount of the second mixture layer is larger than a proportion of the binding agent contained in the first mixture layer to a total amount of the first mixture layer.

13. A positive electrode sheet for a lithium ion secondary battery, including:
    a first mixture layer which contains at least a positive electrode active material; and
    a second mixture layer which is partially covered by the first mixture layer and includes, as a main component, particles different from the positive electrode active material, the first mixture layer and the second mixture layer being formed at both surfaces or one surface of a current collector, which is a strip-shaped sheet wound around a roll, in which the first mixture layer and the second mixture layer are formed continuously in a lengthwise direction of the sheet, and are formed in parallel with each other and parallel to the lengthwise direction of the sheet, and at least one end of the first mixture layer on a widthwise direction side of the sheet is formed to cover a part of the second mixture layer.

14. A positive electrode sheet for a lithium ion secondary battery, including:
   a first mixture layer which contains at least a positive electrode active material; and
   a second mixture layer which is partially covered by the first mixture layer and includes, as a main component, particles different from the positive electrode active material, each of the first mixture layer and the second mixture layer being intermittently formed at both surfaces or one surface of a current collector, which is a strip-shaped sheet wound around a roll, and in a lengthwise direction of the sheet,
   in which the second mixture layer is provided on at least one end side of the first mixture layer in the lengthwise direction of the sheet in a boundary portion between a formed area where the first mixture layer is formed and a non-formed area where the first mixture layer is not formed, and
   one end of the second mixture layer is positioned between the at least one surface of the current collector and a lower surface of the first mixture layer in the formed area of the first mixture layer, and the other end is positioned in the non-formed area.

15. A method for manufacturing a positive electrode sheet for a lithium ion secondary battery, at least including, in the following order:
   a step (A1) of continuously applying a mixture, which contains any one conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4), to a part of both surfaces or one surface of a current collector, which is a strip-shaped sheet wound around a roll, in a lengthwise direction of the sheet;
   a step (B1) of continuously applying a paste-like mixture (P) containing at least a positive electrode active material and a dispersion medium to the lengthwise direction of the sheet; and
   a step (C) of solidifying a formation by drying,
   in which, in the step (B1), the mixture (P) is applied so as to overlap both of a portion including one end, of an area where the mixture containing the conductive substance (M) has been applied in the step (A1), in a widthwise direction of the sheet, and a portion where the mixture containing the conductive substance (M) is not applied, and so as not to overlap a portion including the other end, of the area where the mixture containing the conductive substance (M) has been applied, in the widthwise direction of the sheet.

16. A method for manufacturing a positive electrode sheet for a lithium ion secondary battery, at least including, in the following order:

a step (A2) of intermittently applying a mixture, which contains any one conductive substance (M) selected from a paste-like mixture (M1) containing at least a conductive granular, fibrous, or scaly solid substance and a dispersion medium, a conductive thermoplastic resin (M2), a conductive thermosetting resin (M3), and a conductive ink (M4), to a part of both surfaces or one surface of a current collector, which is a strip-shaped sheet wound around a roll, in a lengthwise direction of the sheet;

a step (B2) of intermittently applying a paste-like mixture (P) containing at least a positive electrode active material and a dispersion medium to the lengthwise direction of the sheet; and a step (C) of solidifying a formation by drying,
   in which, in the step (B2), the mixture (P) is applied so as to overlap both of a portion including one end, of an area where the mixture containing the conductive substance (M) has been applied in the step (A2), in a lengthwise direction of the sheet, and a portion where the mixture containing the conductive substance (M) is not applied, and so as not to overlap a portion including the other end, of the area where the mixture containing the conductive substance (M) has been applied, in the lengthwise direction of the sheet.

17. The method for manufacturing a positive electrode sheet for a lithium ion secondary battery according to 15. or 16.,
   in which, in the step (C), the mixture containing the conductive substance (M) and the mixture (P) are simultaneously solidified.

REFERENCE SIGNS LIST

9: metal foil
10: electrode sheet
11: first mixture layer
12: second mixture layer
15: coated area, formed area
16: area
17: non-coated area, non-formed area
19: boundary portion
22: die coater
30: crack
32: metal foreign matter
34: insulating layer
100: computer
102: CPU
104: memory
105: storage
106: I/O
107: communication I/F
109: bus
110: program
120: separator
121: positive electrode
122: positive electrode active material layer
123: positive electrode current collector layer
124: boundary portion
125: negative electrode tab
126: negative electrode
127: negative electrode active material layer
128: negative electrode current collector layer
129: boundary portion
130: positive electrode tab
131: positive electrode terminal
136: negative electrode terminal 140: flexible film
150: battery

The invention claimed is:

1. A positive electrode for a lithium ion secondary battery, comprising:
   a current collector;
   a first mixture layer which is provided on at least one surface of the current collector and contains at least a positive electrode active material, the positive electrode active material being particles; and
   a second mixture layer which is partially covered by the first mixture layer and includes, as a main component, particles different from the particles of the positive electrode active material, the particles contained in the second mixture layer being a non-active material,
   wherein the second mixture layer is provided on at least one end side of the first mixture layer in a boundary portion between a formed area where the first mixture layer is formed and a non-formed area where the first mixture layer is not formed,
   wherein one end of the second mixture layer is positioned between the at least one surface of the current collector and a lower surface of the first mixture layer in the formed area of the first mixture layer, and the other end is positioned in the non-formed area,
   wherein the first mixture layer further contains a first conductive substance dispersed therein and the second mixture layer further contains a second conductive substance dispersed therein,
   wherein a resistivity of the second mixture layer is in a range of 1 time or more and 100 times or less of a resistivity of the first mixture layer,
   wherein the second conductive substance dispersed in the second mixture layer is contained in an amount of 0.1 parts by mass or more and 20.0 parts by mass or less with respect to a total amount of the second mixture layer,
   wherein the second mixture layer further contains a binding agent dispersed therein, and an amount of the binding agent contained in the second mixture layer is 0.5 parts by mass or more and 60 parts by mass or less with respect to a total amount of the second mixture layer,
   wherein an average particle size of the non-active material particles contained in the second mixture layer as a main component is in a range of 0.1 μm or more and 3.0 μm or less, and
   wherein the average particle size is a particle size at an integrated value of 50% in a particle size distribution determined by a laser diffraction/scattering method, and proportions of particles having a particle size of 0.2 μm or less and particles having a particle size of 2 μm or more which are contained in the second mixture layer as the main component are each 10% by volume or less.

2. The positive electrode for the lithium ion secondary battery according to claim 1,
   wherein the first conductive substance dispersed in the first mixture layer and the second conductive substance dispersed in the second mixture layer are a same substance.

3. The positive electrode for the lithium ion secondary battery according to claim 1,
   wherein the first conductive substance and the second conductive substance includes at least one or more types of carbon materials selected from the group consisting of carbon nanotube, carbon nanohorn, graphene, carbon nanobrush, carbon black, acetylene black, and Ketjenblack.

4. The positive electrode for the lithium ion secondary battery according to claim 1,
   wherein a maximum thickness of the second mixture layer is thinner than a minimum thickness of the first mixture layer.

5. The positive electrode for the lithium ion secondary battery according to claim 1,
   wherein an average thickness of the second mixture layer is in a range of 3 μm or more and 90% or less of an average thickness of the first mixture layer.

6. The positive electrode for the lithium ion secondary battery according to claim 1,
   wherein a density of the second mixture layer is in a range of 0.5 g/cm3 or more and 3.0 g/cm3 or less.

7. The positive electrode for the lithium ion secondary battery according to claim 6,
   wherein the density of the second mixture layer is in a range of 0.9 g/cm3 or more and 3.0 g/cm3 or less.

8. The positive electrode for the lithium ion secondary battery according to claim 1,
   wherein the particles contained in the second mixture layer as a main component include one or more materials selected from the group consisting of alumina, silica, a thermoplastic resin, an ionizing radiation-curable resin, a thermosetting resin, and an insulating ink.

9. The positive electrode for the lithium ion secondary battery according to claim 1,
   wherein the first mixture layer contains a binding agent,
   wherein the binding agent contained in the second mixture layer is of the same type as the binding agent contained in the first mixture layer, and
   wherein a proportion of the binding agent contained in the second mixture layer to a total amount of the second mixture layer is larger than a proportion of the binding agent contained in the first mixture layer to a total amount of the first mixture layer.

10. The positive electrode for the lithium ion secondary battery according to claim 1, wherein the amount of the second conductive substance dispersed in the second mixture layer is more than 5 parts by mass and equal to or less than 20.0 parts by mass with respect to the total amount of the second mixture layer.

11. A positive electrode sheet for a lithium ion secondary battery, having
   a first mixture layer which contains at least a positive electrode active material, the positive electrode active material being particles, and
   a second mixture layer which is partially covered by the first mixture layer and includes, as a main component, non-active material particles different from the positive electrode active material formed, on both surfaces or one surface of a current collector, which is a strip-shaped sheet wound around a roll, continuously in a lengthwise direction of the sheet, and formed in parallel with each other and parallel to the lengthwise direction of the sheet, and
   at least one end of the first mixture layer on a widthwise direction side of the sheet is formed to cover a part of the second mixture layer,
   wherein the first mixture layer further contains a first conductive substance dispersed therein and the second mixture layer further contains a second conductive substance dispersed therein, wherein a resistivity of the second mixture layer is in a range of 1 time or more and 100 times or less of a resistivity of the first mixture layer, wherein the second conductive substance dispersed in the second mixture layer is contained in an amount of 0.1 parts by mass or more and 20.0 parts by mass or less with respect to a total amount of the second mixture layer, wherein the second mixture layer further contains a binding agent dispersed therein, and an amount of the binding agent contained in the second mixture layer is 0.5 parts by mass or more and 60 parts by mass or less with respect to a total amount of the second mixture layer, wherein an average particle size of the non-active material particles contained in the second mixture layer as a main component is in a range of 0.1 μm or more and 3.0 μm or less, and wherein the average particle size is a particle size at an integrated value of 50% in a particle size distribution determined by a laser diffraction/scattering method, and proportions of particles having a particle size of 0.2 μm or less and particles having a particle size of 2 μm or more which are contained in the second mixture layer as the main component are each 10% by volume or less.

12. A positive electrode sheet for a lithium ion secondary battery, having a first mixture layer which contains at least a positive electrode active material, the positive electrode active material being particles, and a second mixture layer which is partially covered by the first mixture layer and includes, as a main component, non-active material particles different from the positive electrode active material intermittently formed on both surfaces or one surface of a current collector, which is a strip-shaped sheet wound around a roll, and formed in a lengthwise direction of the sheet, wherein the second mixture layer is provided on at least one end side of the first mixture layer in the lengthwise direction of the sheet in a boundary portion between a formed area where the first mixture layer is formed and a non-formed area where the first mixture layer is not formed, and one end of the second mixture layer is positioned between the at least one surface of the current collector and a lower surface of the first mixture layer in the formed area of the first mixture layer, and the other end is positioned in the non-formed area, and wherein the first mixture layer further contains a first conductive substance dispersed therein and the second mixture layer further contains a second conductive substance dispersed therein, wherein a resistivity of the second mixture layer is in a range of 1 time or more and 100 times or less of a resistivity of the first mixture layer, wherein the second conductive substance dispersed in the second mixture layer is contained in an amount of 0.1 parts by mass or more and 20.0 parts by mass or less with respect to a total amount of the second mixture layer, wherein the second mixture layer further contains a binding agent dispersed therein, and an amount of the binding agent contained in the second mixture layer is 0.5 parts by mass or more and 60 parts by mass or less with respect to a total amount of the second mixture layer, wherein an average particle size of the non-active material particles contained in the second mixture layer as a main component is in a range of 0.1 μm or more and 3.0 μm or less, and wherein the average particle size is a particle size at an integrated value of 50% in a particle size distribution determined by a laser diffraction/scattering method, and proportions of particles having a particle size of 0.2 μm or less and particles having a particle size of 2 μm or more which are contained in the second mixture layer as the main component are each 10% by volume or less.

* * * * *